May 22, 1951 L. HAMMOND 2,554,329

REMOTE CONTROL APPARATUS

Filed July 20, 1944 2 Sheets-Sheet 1

Inventor
Laurens Hammond
By Benjamin F. Wupper
Atty.

Inventor
Laurens Hammond
By Benjamin F. Nupper
Atty.

Patented May 22, 1951 2,554,329

UNITED STATES PATENT OFFICE

2,554,329

REMOTE-CONTROL APPARATUS

Laurens Hammond, Chicago, Ill., assignor to Hammond Instrument Company, Chicago, Ill., a corporation of Delaware

Application July 20, 1944, Serial No. 545,840

13 Claims. (Cl. 250—2)

1

My invention relates generally to remote control apparatus and more particularly to apparatus suitable for the radio control of a glider from an airplane.

In radio remote control apparatus, particularly for use in warfare, it is highly desirable, if not necessary, to provide means for eliminating the effects of static and to have the apparatus responsive only to the transmitted control signal and non-responsive to jamming signals which may be broadcast by the enemy.

It is therefore one of the primary objects of my invention to provide a remote control apparatus which is operative through a radio transmission channel and which will not respond to static, to random noise signals, or even to preselected jamming signals.

A further object is to provide a remote control signal apparatus, the coding of which is such that the system employed will be difficult to reconstruct from listening to or making a record of the radio signals employed and which may therefore readily be maintained secret.

A further object is to provide an improved radio remote control system employing at the transmitting or command station a plurality of audio frequency sources as modulation frequencies for radio carrier frequencies, and at the receiving station operating control circuits in response only to the highest amplitude audio frequency signal received.

A further object is to provide an improved remote control system in which a plurality of audio frequencies are selectively transmitted over a radio frequency carrier to effect selected control functions, and in which an additional audio frequency is transmitted when none of the controlling audio frequencies are being transmitted, said additional frequency being operative at the receiver to prevent jamming signals at the control frequencies from having a controlling effect.

A further object is to provide an improved radio remote control system for the control of landing lights and the like at an airport from an approaching airplane.

A further object is to provide an improved radio remote control system and apparatus which may be applied to perform various control functions, the system of which is difficult of deciphering, which is not affected by static or random interference, and which will be effective and efficient in operation under adverse conditions.

Other objects will appear from the following

2 description, reference being had to the accompanying drawings in which:

Figures 1 and 1*a* together constitute a block and wiring diagram of a complete remote control system for steering a glider from an airplane or other remote control station; and Figure 2 is a block and wiring diagram of a radio remote control system for the control of airport floodlights and the like or for performing other operations under the control of a command station in an airplane.

*General description of the method and apparatus*

In general, the control system of the invention employs a radio transmitter and a radio receiver tuned to the same carrier frequency. At the transmitter there are a plurality of sources of different audio frequencies which may be selectively utilized for the modulation of the carrier frequency of the transmitter. Whenever the number of distinctive control functions to be performed is eleven or less, the audio frequencies used are preferably those of alternate or successive semitone intervals within one octave of the musical scale so that any second and higher order harmonics which may be present in the lower audio frequencies employed will not lie within the audio frequency bands of the higher frequencies employed. In this way the audio frequency signal need not necessarily be a sine wave, but instead, may include harmonic distortion components without adversely affecting the operation of the system.

At the receiver the audio frequency output is applied to a plurality of filtering meshes tuned respectively to the audio frequencies employed, these meshes being employed in the grid circuits respectively of selector pentodes, the cathodes of which are connected to a common self-bias mesh. These pentodes are matched tubes so that when an audio frequency signal is impressed upon their grids, the particular pentode having the highest voltage signal impressed thereon will be rendered far more conductive than the other pentodes, since due to the common self-bias the pentode which is rendered conductive will increase the effective bias on the other pentodes and thereby make it necessary that a higher amplitude signal be impressed upon their grids in order to render them or any of them conductive.

The outputs of these selector pentodes are coupled to relay operating amplifying pentodes in such manner that the latter must receive an output signal from the selector pentodes, to which they are respectively connected, for an appreciable time interval before they are capable of operating their associated relays.

One of the selector pentode circuits does not have a relay operating pentode coupled thereto but operates merely as what I prefer to term a cancelling device, to prevent operation of any of the other selector pentode circuits while the cancelling frequency is being transmitted. In this way any jamming signal, even that of the correct carrier frequency and modulated by one of the selected audio frequencies, could not operate the controls unless such signal were of greater amplitude at the receiver than the cancelling signal.

The control system is operated by transmitting the audio frequency modulated carrier frequency at all times. During the intervals when it is not desired to effect a control function, the carrier frequency is modulated by the cancelling frequency and thus spurious operation of the controlled apparatus by static impulses, or by enemy jamming signals, is prevented.

*Detailed description of the transmitter of Figure 1*

Figures 1, 1A:
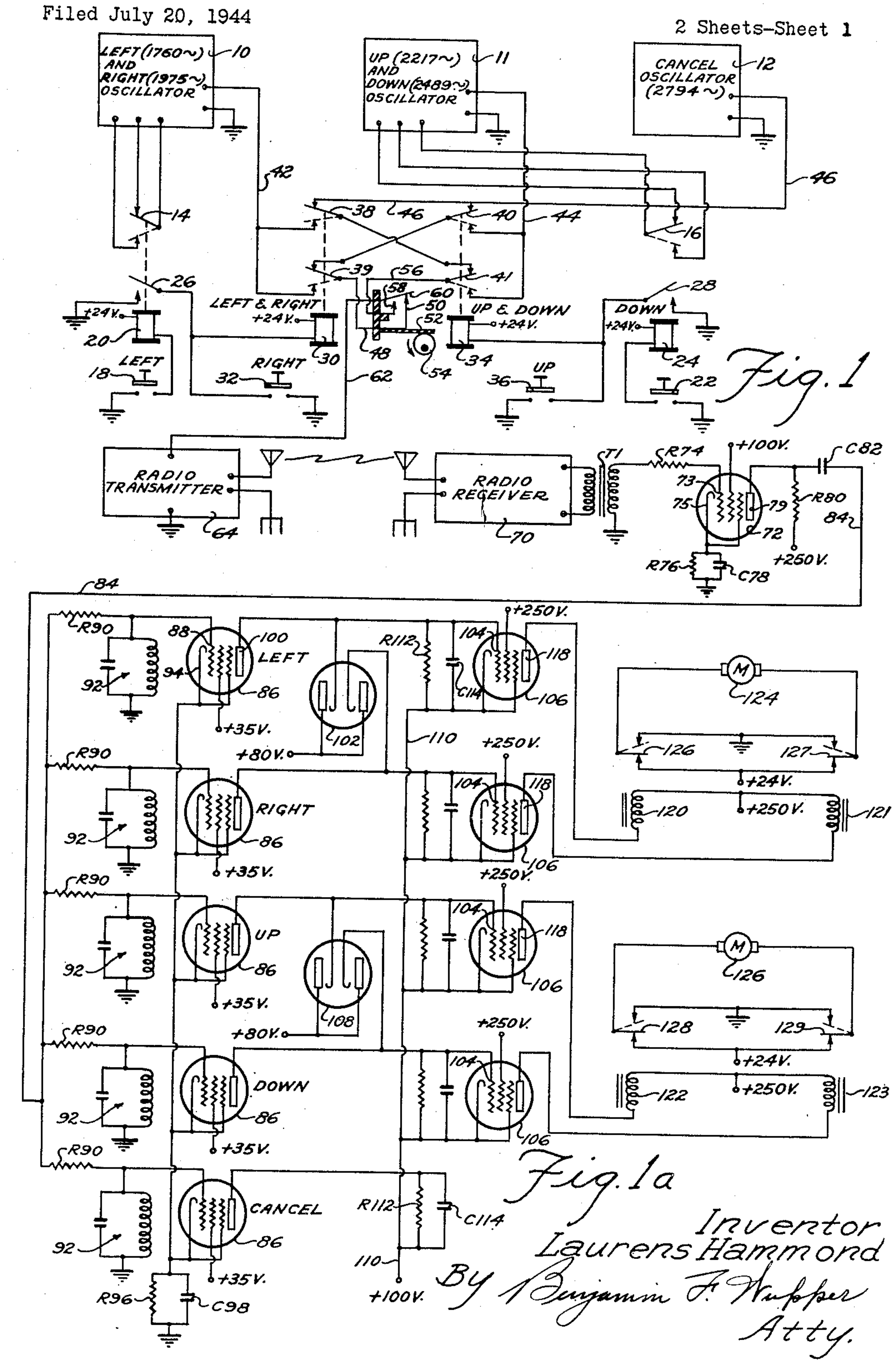

Referring to Fig. 1 there are diagrammatically illustrated as blocks a plurality of sources of audio frequencies, the block 10 representing for example an oscillator capable of being selectively tuned to a frequency of 1760 C. P. S. or 1975 C. P. S., the block 11 representing an oscillator capable of being selectively tuned to either 2217 C. P. S. or 2489 C. P. S. and the block 12 representing an oscillator generating a frequency of 2794 C. P. S. (These frequencies correspond to the musical tones A5, B5, C6#, D6# and F6.) The oscillator 10 has suitable tuning circuits by which its frequency may be shifted, these circuits being under the control of a switch 14 which, when in its full line position, causes the oscillator to generate a frequency of 1975 C. P. S. and, when in its dotted line position, causes the oscillator to generate a frequency of 1760 C. P. S. Similarly, the oscillator 11 generates a frequency of 2217 C. P. S. when its tuning switch 16 is in full line position and a frequency of 2489 C. P. S. when said switch is in its dotted line position. The oscillator 12 may be a fixed frequency oscillator.

Any suitable form of oscillator may be employed which has stable frequency characteristics under various temperature and humidity conditions.

As illustrated in Figs. 1 and 1*a*, the control apparatus is intended for the remote control of a glider from a command airplane. The oscillators and various parts of the system therefore have legends applied thereto corresponding to the various steering control operations to be effected, namely, "Left," "Right," "Up," "Down" and "Cancel."

When a Left control push button 18 is depressed, it energizes a relay 20 which moves the switch 14 from full line to dotted line position. Similarly, when a Down push button 22 is depressed, it energizes a relay 24 which moves a switch 16 from full line to dotted line position. In addition to operating the switches 14 and 16, the relays 20 and 24, upon energization, close switches 26 and 28 respectively. Closure of the switch 26 results in energization of a Left and Right relay 30. This relay may also be energized by depressing a Right push button 32. In a similar way closure of the relay switch 28 energizes relay 34 which may likewise be energized by depression of an Up push button 36. The relay 30 operates a pair of single pole double throw switches 38 and 39, while the relay 34 is adapted to operate single pole double throw switches 40 and 41.

The output of oscillator 10 is transmitted through conductor 42 to the lower contacts of switches 38 and 39, while the output of oscillator 11 is transmitted through conductor 44 to the lower contacts of switches 40 and 41. The output of oscillator 12 is transmitted through conductor 46 to the upper contacts of switches 38 and 40. The movable contact of switch 40 is connected to the upper contact of switch 39, while the movable contact of switch 38 is connected to the upper contact of switch 41. A conductor 48 connects the movable contact of switch 39 to a contact 50 carried by an insulating arm 52 which is swung up and down by a cam 54 rotated at a speed of approximately 11 revolutions per second. The movable contact of switch 41 is connected by conductor 56 with a fixed contact 58. A pivoted switch arm 60 is adapted to cooperate with the contacts 50 and 58 and is connected by a conductor 62 with a radio transmitter 64. This transmitter is carried by the command airplane and the audio frequency supplied through the conductor 62 is utilized to modulate its carrier frequency.

From the foregoing it will appear that when none of the pushbuttons is operated, the cancelling frequency from the oscillator 12 is continuously supplied to the radio transmitter 64 through conductor 46, switch 40, switch 39, conductor 48, switch contacts 50 and 60 and conductor 62 during the time that the cam 54 is elevating the arm 52 above its median position. As the cam 54 permits the arm 52 to swing downwardly below its median position, the switch arm 60 first makes contact with the contact 58 and immediately thereafter the contact 54 leaves the switch 60, since further downward movement of the latter is arrested by the fixed contact 58. Under the latter conditions the cancelling frequency is supplied to the transmitter through conductor 46, switch 38, switch 41, conductor 56, contact 58, switch arm 60 and conductor 62.

When the glider is to be controlled, for example, to be steered to the left, the Left push button 18 is depressed, energizing the relay 20 and thereby moving the switch 14 to its dotted line position to tune the oscillator to the Left control frequency and closing the switch 26. Closure of the switch 26 results in energization of the relay 30, moving the switches 38 and 39 to their dotted line positions. In their dotted line positions the switches 38 and 39 open the circuits between the cancelling frequency oscillator 12 and the transmitter 64, and the Left audio frequency is transmitted through conductor 42, switch 38 and switch 41 to the conductor 56, and also through the switch 39 to the conductor 48. Since the Left audio frequency is present on both conductors 56 and 48, the opening and closing of the switches 50—60 and 58—60 does not have any effect, and the Left control frequency is thus continuously supplied to the radio transmitter 64. In a similar way, when the Right control push button is depressed, the relay 30 is energized but, since the switch 14 remains in full line position, the Right control audio frequency is conducted to the radio transmitter through the circuits previously described.

When the Down push button 22 is depressed, the relay 24 is energized and by its operation of the switch 16 to its dotted line position causes the Down audio frequency to be impressed on the conductor 44. Closure of the switch 28, upon energization of the relay 24, results in energization of the relay 34 so that the conductor 44 is connected to both conductors 48 and 56. Thus throughout the cycle of rotation of the cam 54, a Down frequency will be supplied to the transmitter 64 to modulate the carrier wave radiated thereby.

Under certain circumstances, it may be desirable to transmit to the glider two signals, one being either up or down and the other being either right or left. Since the system is one which is inherently capable of transmitting only one audio frequency at a time, the switch mechanism operated by the cam 54 is provided to cause alternate transmission throughout equal intervals of time of the two signals which it is desired to transmit. The operation of the transmitting apparatus under such circumstances is as follows:

Assume that the glider is to be steered to the right and upwardly. The push buttons 32 and 36 would therefore be depressed and held depressed as long as such steering control was desired. As a result of depression of these push buttons, the oscillators 10 and 11 would generate the proper frequencies for respectively controlling Right and Up. Both relays 30 and 34 would be energized upon depression of the two push buttons and therefore the signal from the oscillator 10 would be impressed upon conductor 48 and contact 50 whereas a signal from the oscillator 11 would be impressed upon the conductor 56 and contact 58. As the follower arm 52 swings upwardly beyond its center position the contact between the switch arm 60 and contact 58 would be broken while the contact between switch elements 50 and 60 would be made. The Right signal from the oscillator 10 would therefore be impressed upon the radio transmitter during the interval that the arm 52 is swung above its median position, whereas, when the arm 52 is below its median position the switch contact 58 will contact the switch arm 60 and arrest movement of the latter and the contact between switch elements 50 and 60 would be broken. Thus, while the arm 52 is below its median position the Up signal from the oscillator 11 is effective to modulate the transmitter 64. From the foregoing it will be clear that the radio transmitter 64 would have its carrier wave modulated alternately, at $\frac{1}{22}$ second intervals, by the Up and the Right audio frequencies.

Whenever the transmitting apparatus is in operation, the carrier will be modulated by one of the five audio frequencies. As long as only one of the push buttons is held depressed, its associated modulating frequency will be continuously supplied to the transmitter. As long as two non-conflicting push buttons are held depressed, the corresponding two modulating frequencies will be alternately supplied to the transmitter for $\frac{1}{22}$ second intervals. If none of the push buttons is depressed, the cancel frequency will be continuously supplied to the transmitter.

*Detailed description of the receiving station of Fig. 1a*

Upon the glider or other remotely controlled vehicle or other apparatus there is located a radio receiver 70 which is tuned to the frequency of the carrier of the transmitter 64. In addition to being provided with the usual automatic volume control responsive to the amplitude of the carrier frequency, it is preferable that the receiver 70 be provided with an automatic volume control responsive to the amplitude of the audio frequency.

The audio frequency output circuit of the receiver 70 is coupled by a transformer T1 to the input of a pentode 72 which operates as an amplitude limiting distorting tube, the output signals of which are rectangular or box-shaped waves.

The grid 73 of the pentode 72 is connected to the ungrounded terminal of the secondary of transformer T1 through a grid resistor R74, while the cathode 75 is connected to ground through a self-bias resistor R76 and a by-pass condenser C78. The suppressor grid is externally connected to the cathode while the screen grid is connected to a suitable operating potential indicated as +100 v. The plate 79 of the pentode 72 is connected to a suitable direct current potential source indicated as +250 v. through a load resistor R80, the alternating component of the plate current being transmitted through a condenser C82 to a conductor 84.

A plurality of selector pentodes 86, preferably of the 6SJ7 type, are provided, each having its grid 88 connected to the conductor 84 through a decoupling resistor R90. Also connected between each of the grids 88 and ground is a high Q parallel resonant mesh 92, these meshes being respectively tuned to resonate, and thus offer high impedance, at the audio frequencies generated by the oscillators 10, 11 and 12. The cathodes 94 of the pentodes 86 are connected to ground through a common self-bias resistor R96 (of relatively high value—in the order of 120,000 ohms) and a common by-pass condenser C98. The screen grids of the selector pentodes 86 are connected to a relatively low direct current potential source indicated as +35 v. while the suppressor grids of these tubes are externally connected to the cathodes.

The plates 100 of the pentodes 86 for the Left and Right channels are respectively connected to the cathodes of a twin diode 102, the plates of the latter being connected to a suitable direct current potential source indicated as +80 v. The plates 100 are also directly connected to the grids 104 of relay operating pentodes 106. In a similar way the plates 100 for the Up and Down channels are directly coupled to the grids 104 of the relay operating pentodes 106 for the Up and Down channels. The grids 104 and plates 100 of these latter two channels are also respectively connected to the cathodes of a twin diode 108, the plates of the latter being connected to a +80 v. source.

Plate current is supplied to the pentodes 86 from a +100 v. source through a conductor 110 and individual plate load resistors R112. A condenser C114 is connected in parallel with each of the load resistors R112. The cathodes and suppressor grids of the pentodes 106 are connected to the conductor 110 and hence to the +100 v. potential source. The screen grids of the pentodes 106 are connected to a suitable operating potential source indicated as +250 v. The plates 118 of the pentodes 106 for the Left, Right, Up and Down channels are respectively connected to a plate voltage source indicated as +250 v. through relay windings 120, 121, 122 and 123. The relays 120, 121 control the direction of rotation of a permanent magnet field motor 124 through the operation of reversing switches 126 and 127. In a similar manner the relays 122 and 123, by the operation of reversing switches 128 and 129, control the direction of current flow through the armature of a motor 126 which is likewise of the permanent magnet field, or separately excited field, type. The motors 124 and 126, in conjunction with suitable gyro-pilot apparatus, control the positions of the aerodynamic controls of the glider.

Since the audio frequency output of the radio receiver 70 is supplied to the selector pentodes 86 through the constant amplitude box wave distorter pentode 72, all signals above a predetermined amplitude will be impressed upon the input circuits of the pentodes 86 at a given amplitude, and, for the same reason, high intensity static impulses or interfering signals will not be transmitted to the input circuits of the pentodes 86 with an intensity greater than that of the normal signal received from the transmitter 64. When the amplitude of the audio frequency signal impressed upon the distorter tube 72 does not exceed a predetermined amplitude, the output is not a box wave, in fact, the tube may act as an amplifier and the wave shape of the output may correspond more nearly to that of the input signal.

When a control signal is transmitted by the transmitter 64 and received by the receiver 70 and impressed upon the inputs of the pentodes 86, the amplitude of the signal upon one of these pentodes will necessarily be very much greater than the amplitude of such signal as it appears across the inputs of the remaining pentodes 86. Due to the high value of common self-bias resistor R96, the plate currents of the pentodes 86 are normally (when the voltage on the signal conductor 84 is zero) reduced to a very low value approaching but not exceeding plate current cutoff. When one of the signal frequencies is present the high Q tuned meshes 92 will be effective to offer widely differing impedances and one of them will be of particularly high impedance because its resonant frequency coincides with that impressed upon the conductor 84. For example, if the Left frequency (1760 C. P. S.) is used to modulate the radio transmitter 64, is received by the radio receiver 70, and is impressed upon the tuned mesh 92 for the Left channel of the receiver, the grid 88 of the pentodes 86 of this channel will be subject to the widest fluctuations in voltage. The positive portions of such fluctuations will be effective to cause corresponding increases in plate current through this pentode and such increases in plate current will be effective to increase further the voltage across the self-bias condenser C98. Because of this increase in voltage across the self-bias mesh comprising resistor R96 and C98, the threshold of plate current cutoff will be exceeded and thus the pentodes 86 associated with other than the Left channel will be substantially cut off.

However, the pentode 86 associated with the Left channel will be effective to pass the positive fluctuation of its grid signal and thus a pulsating voltage will develop across its plate load resistor R112 and the condenser C114 in parallel therewith. Condenser C114 is made large by comparison with resistor R112 in order that the voltage on the grid 104 may be reduced by successive negative impulses. It will be recalled that the cathodes of the pentodes 106 are at a potential of +100 v. and, since the plates of the twin diode rectifiers 102 and 108 are maintained at a potential of +80 v., the maximum potential difference between the grids 104 and their associated cathodes cannot exceed 20 volts. The pentodes 106 may be of the 6SJ7 type in which a bias of —20 v. is sufficient to cause substantial plate current cutoff. Thus when the grid 104 of the pentode 106 in the Left channel has its voltage progressively reduced by successive negative impulses, the pentode 106 will be cut off and the reduction in plate current will result in the substantial deenergization of its relay 120, whereupon switch 125 will move to its dotted line position and thus complete an energizing circuit for the armature of the motor 124, thus causing it to rotate in the direction necessary to steer the glider to the left. Upon the reception of a Right signal, the Right channel of the receiving system will operate in the manner above described to increase the effective grid bias on all of the pentodes 86 except that associated with the Right channel and thus cause the pentode 106 for the Right channel to become substantially cut off, deenergizing relay 121 and permitting its switch 127 to move to its dotted line position. Current will therefore flow through the armature 124 in a reverse direction, thereby reversing the direction of rotation of this motor and causing the glider to be steered to the right.

In a similar manner the direction of rotation of the motor 126 is controlled by the reception of signals which will be transmitted through the Up and Down channels, and the angle of glide of the glider will thereby be controlled.

Whenever the cancel signal (2794 C. P. S.) is received, the pentode 86 for the cancel channel will be rendered more conductive and will thereby increase the grid bias on pentodes 86 for the remaining channels and render it extremely difficult, if not impossible, for any static impulses to be transmitted through the other four channels. As a result, the relays 120 to 123 will remain energized and the motors 124 and 126 will be deenergized and stationary.

The plates of the twin diodes 102 and 108 are indicated as being connected to a +80 v. source of potential which potential corresponds to safe cutoff of the relay operating tubes 106. These diodes are incorporated in the circuit to prevent unusually large signals appearing on the conductor 84 from being effective to cause the voltage on their control grids 104 from reaching values far in excess of their plate current cutoff. If these twin diodes were not provided, such excessive negative voltages on the grids 104 would result in an undesirably extended release time in the operation of the relays 120 to 123 after the transmission of the control signal had stopped. Thus the inclusion of these diodes in the circuit is effective substantially to equalize relay operation, irrespective of the signal amplitude. By making the condenser C114 of sufficiently high capacitance relative to the resistance of resistors R112, the grids 104 are maintained negatively biased for a sufficient interval of time after the cessation of the reception of the control signal that the particular relay 120 to 123 which has been deenergized will remain deenergized during an interval of slightly more than $\frac{1}{12}$ of a second. This relatively slow release time of the relays 120 to 123 is desirable so that when either the Right or Left push button 18 or 32 is pushed at the same time that either the Up or Down push buttons 36, 22 is depressed, the relays 120 to 123 associated with the depressed push buttons will remain deenergized during the $\frac{1}{22}$ second time interval that the control signal is not supplied due to the interruption caused by the switch mechanism operated by the cam 54.

As previously stated the pentodes 86 are of the sharp cutoff type as represented by the 6SJ7 type and are preferably matched in sets so as to have uniform cutoff voltages. Therefore, even though the signal supplied from the transmitter 64 appears as a relatively low voltage upon the grid 88 of a particular pentode 86, for example the one in the Left channel, and signals of amplitude approaching 90% of that of the signal amplitude on this grid appear upon the grids of one or more of the remaining pentodes 86, the signals on the grids of the latter pentodes will not be effective to cause sufficient plate current in the pentode 86 to cut off associated relay operating pentodes 106. This is because of the relatively high value of the self-bias resistor R96 and because of the very low value of signal voltage required to cause appreciable transmission of plate current through the pentodes 86. This low value of signal voltage on the control grid of one of the pentodes 86 required to cause plate current cutoff of the other pentodes 86 is enhanced by the relatively high gain of the 6SJ7 and by the low voltage applied to screen grids. The screen voltage (+35 v.) is the minimum value sufficient to allow the cutoff voltage to develop on the grids 104 of relay operating tubes 106.

In other words, the absolute amplitude of the signals impressed upon the grids 88 of the pentodes 86 is not of great significance but the important consideration is that the amplitude of the signal peak voltage impressed upon one of these grids exceeds that of the signal voltage on each of the other grids by at least a certain small value and that this slight excess be sufficient to cause the voltage drop across the self-bias resistor R96 to exceed the threshold.

This threshold may be considered to be at the cathode voltage at which the grid bias on all of the pentodes 86 is so close to cutoff that only the pentode having the highest voltage signal in its input circuit will conduct enough plate current to reduce the plate current in its associated pentode 106 sufficiently to release its relay (e. g. relay 120). This threshold will therefore not be fixed but will vary with the amplitude of the highest voltage signal impressed on the input circuits of the pentodes 86.

A good test for determining whether the pentodes 86 and their associated circuits are well matched is to impress a random noise signal successively with the several control frequencies upon the conductor 84 and to adjust the decoupling resistors R90 to be of values which provide equal signal-to-noise ratios for the control frequencies employed. In furtherance of this operation whereby only the highest peak voltage input signal impressed upon the various pentodes 86 is effective to control the deenergization of its associated relay, the pentodes 106 are likewise of the sharp cutoff type and thus a very small increase in the input signals to these latter tubes will cause them to cut off and thereby deenergize their associated relays.

It will be apparent therefore that the system as a whole differentiates between a plurality of frequencies, disregarding all except the frequency which is of highest positive peak amplitude at the grids 88. There is no absolute threshold which determines which of the channels will become effective but it is merely one of relativity and the relativity is determined with a high degree of sensitivity. As a result, the system as a whole can be jammed only if the jamming signal is: (1) of exactly the proper carrier frequency and remains at this proper frequency for an adequate length of time; (2) that during the period that the interfering carrier frequency is exactly maintained, an audio frequency of substantially the same frequency as one of the signal frequencies is transmitted for an adequate time interval; and (3) that the interfering audio frequency signal results in a signal of greater voltage on the conductor 84 than the voltage due to the particular controlling signal frequency then being transmitted by the transmitter 64.

It will be recalled that the transmitting system is so arranged that when the Up, Down, Right or Left signal frequency is not being transmitted, the cancel frequency will be transmitted. Thus any interfering signal will at all times have to compete with the energy supplied by the transmitter 64 and will only be effective to interfere with the operation of the remote control system as a whole if the energy of the interfering signal is concentrated on one of the signal frequencies and it exceeds in amplitude the signal which the receiver 70 obtains from the transmitter 64.

If it were attempted to jam the control system by means of a random noise signal, it will be apparent that the component of the random noise of at least one of the five different signal frequencies would have to exceed in amplitude that of the signal transmitted by the transmitter 64 and, for this reason, it will be readily apparent that interference, whether it be intentional or not, has very little chance of producing a disturbing effect upon the remote control system as a whole.

It will be understood that although only five signal frequencies and channels therefor are utilized in the system illustrated, the system as a whole may be expanded to include any reasonable number of different frequency generators and signal channels. Furthermore, for some uses it may be desirable to utilize combinations of the several signal frequencies, in sequence or in rapid alternation, to produce an ultimate signal controlled function at the receiving station.

Various modifications of the apparatus may likewise be employed, especially when not subject to enemy interference and jamming efforts, without using the cancel signal frequency. A system of this character is illustrated in Fig. 2.

Figure 2:
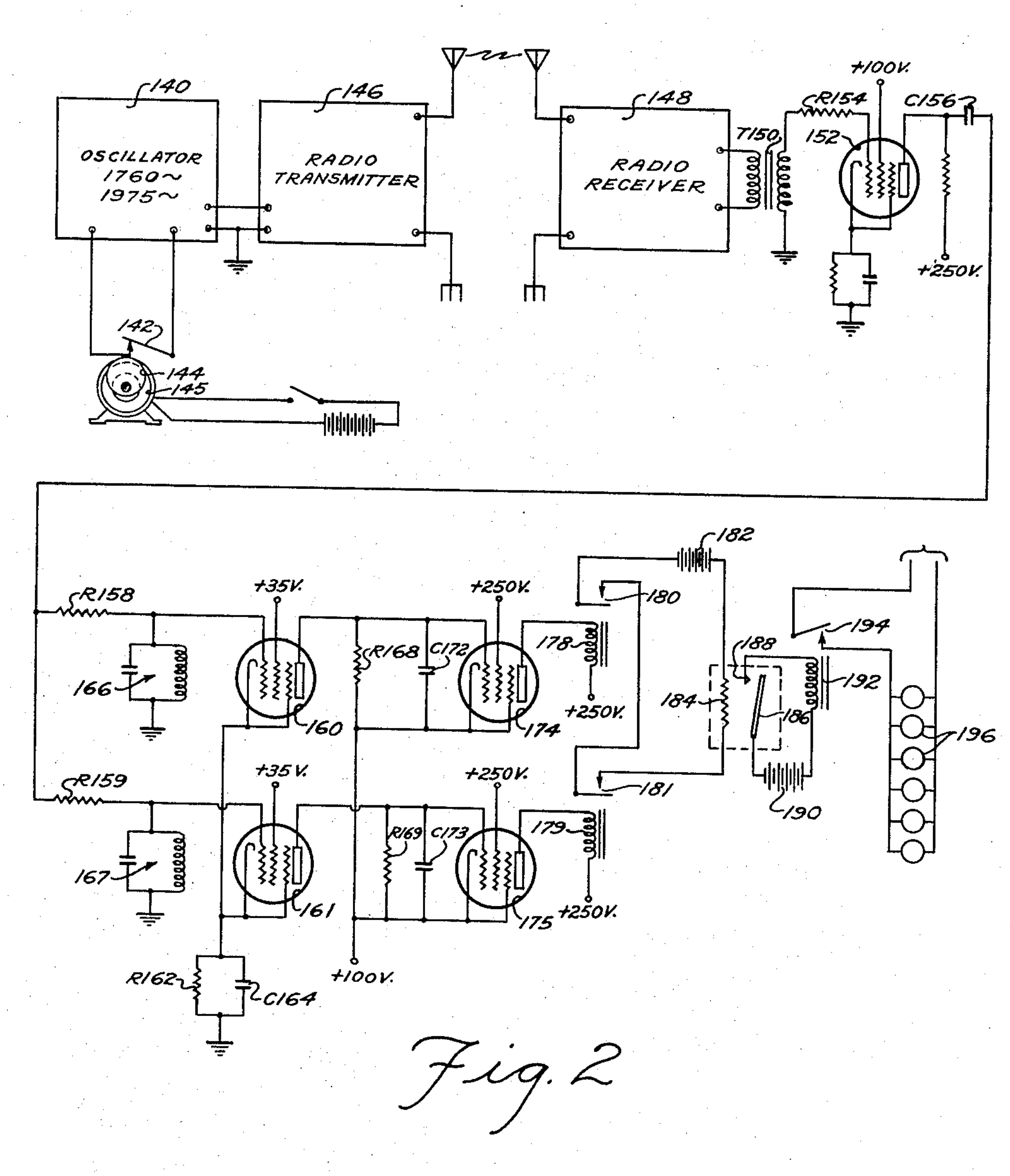

*Detailed description of the system of Figure 2*

In Figure 2 there is provided an oscillator 140 which has a switch 142 associated therewith, the switch being operated by an insulating cam 144 so as to be closed during approximately one half the time. The cam 144 may be rotated any suitable speed, for example 6 r. p. s. The circuit including the switch 142 is operative to change the tuning of the oscillator 140, for example, between 1760 C. P. S. and 1975 C. P. S. so that during one half the time each of these frequencies will be generated. The frequencies generated by the oscillator 140 are supplied to radio transmitter 146 to modulate the carrier wave output of the latter.

The oscillator and radio transmitter are adapted to be carried by an airplane and are provided for effecting control operations on another airplane or upon the ground. Fig. 2 illustrates, for example, the control of the lighting of runway indicating lamps and flood light lamps of an airport by means of control signals transmitted from the airplane. In this illustrative embodiment of the invention the radio receiver 148 located at the air field has its output coupled through a transformer T150 to the input of an amplitude limiting box wave distorter pentode 152. The coupling is effected through a grid resistor R154, and this pentode is operated in the same manner as the pentode 72 described in connection with Fig. 1*a*. The output of the pentode 152 is supplied through a blocking condenser C156 through a pair of decoupling resistors R158 and R159 to the control grids of selector pentodes 160, 161. The cathodes of these pentodes are provided with a common self-biasing resistor R162 having a by-pass condenser C164 in parallel therewith. A parallel resonant mesh 166 is connected between ground and the grid of the pentode 160 and is tuned so as to be resonant at one of the signal frequencies, for example, 1760 C. P. S. Similarly, a resonant mesh 167 is connected to the grid of the pentode 161, this mesh being resonant at the other signal frequency, namely 1975 C. P. S.

Plate current is supplied to the pentodes 160, 161 from a suitable potential source indicated as +100 v. through load resistors R168 and R169, these resistors having condensers C172 and C173 connected in parallel therewith respectively. The plates of the pentodes 160, 161 are respectively connected to the grids of similar pentodes 174, 175, while the cathodes and suppressor grids thereof are connected to the +100 v. terminal. Plate current is supplied to the pentodes 174, 175 from a +250 v. source through relay windings 178 and 179, respectively, these relays being normally energized, but upon being deenergized being adapted respectively to close switches 180 and 181. The switches 180 and 181 are connected in series with a source of energy indicated as a battery 182 and a resistance heating element 184. The heating element 184 forms part of a thermal delay relay comprising a bi-metal element 186 adapted to complete a circuit with a contact 188, the completed circuit including a source of energy, shown as a battery 190, and the winding of a power relay 192 having a switch 194. The switch 194 of the power relay 192 is adapted to complete a circuit from a power supply line to a plurality of lamps 196 which are representative of the various airport illumination facilities and may also include warning signals and the like to apprise persons at the airport of the approach and prospective landing of an airplane.

In operation, the pilot will complete a circuit to energize the motor 145 which drives the cam 144 and otherwise condition the oscillator 140 and transmitter 146 for operation. When thus conditioned, the oscillator will alternately (at approximately $\frac{1}{12}$ second intervals) transmit the two signal frequencies of 1760 C. P. S. and 1975 C. P. S. These signals will be received by the receiver 148 and transmitted through the distorter pentode 152 to the selector pentodes 160 and 161. Since the meshes 166 and 167 are tuned to the two signal frequencies being received, these pentodes will be alternately rendered conducting and consequently pentodes 174 and 175 will alternately be rendered non-conducting. However, because of the time delay occasioned by the provision of the condensers C172 and C173 operating in conjunction respectively with the resistors R168 and R169, the relays 178 and 179 will remain deenergized during the approximately $\frac{1}{12}$ second intervals between the reception of their respective signal frequencies. When both relays 178 and 179 are thus deenergized, the series circuit through the resistance heater 184 is completed and after a predetermined time lag, such as one or two seconds, which is imparted by the thermal relay, the bi-metal element 186 of the latter will be heated sufficiently to flex and engage the contact 188, thereby completing the circuit through the winding of power relay 192. Energization of the latter will of course complete the circuit to the lamps to be controlled.

It will be apparent that with this system of Fig. 2 it is necessary, to cause effective control of the apparatus at the airport, that the carrier be of proper frequency and that two audio frequency modulating signals be received in rapid alternation for a given period of time. If the alternations between the two modulating frequencies are not at a sufficiently rapid rate, the switches 180 and 181 will not be simultaneously closed and therefore the circuit through the heater 184 will not be completed. Furthermore, such rapid alternation of the two modulating signal frequencies must be continued for a sufficiently long time to cause closure of the thermal relay which includes the bi-metal element 186. The latter element is preferably so constructed (as by being enclosed in a thermally insulated container) that having been closed it will remain closed for a predetermined length of time such as two, five or ten minutes. The illumination of the airport will continue for a sufficient length of time to permit the plane to land, even though the transmission of the controlling frequencies is discontinued.

It will be clear that random frequencies, due to natural and man-made static, will have little chance of causing energization of the controlled apparatus, since it is very unlikely that any randomly produced static effects will have sufficient energy at the two control signal frequencies to cause simultaneous operation of the two relays 178 and 179, and further it is still more improbable that any such high energy random interference would continue over a sufficiently long interval to cause the thermal relay 184, 186 to be energized. The apparatus at the controlled station is thus very selective to a control signal of predetermined characteristics and will not be operated by any other type of signal.

It will be understood by those skilled in the art that the invention disclosed herein may be embodied in other than the two forms illustrated to accomplish various modified results and that diverse variations and modifications may thus be made without departing from the underlying principles of the invention. I therefore desire by the following claims to include within the scope of my invention all such variations and modifications by which substantially the results of the invention may be obtained by the use of substantially the same or equivalent means or method.

I claim:

1. In a command station for a remote control system the combination of means for supplying a plurality of different audio frequencies for the control of two groups of functions in which one function selected from one group may be simultaneously performed with another function selected from the other group, means for supplying a cancelling audio frequency, a signal transmission channel, means normally coupling said means supplying said cancelling frequency to said transmission channel, means for continuously supplying to said transmission channel a frequency for one of said groups of functions when a single control function is to be effected and continuously operating switch means operative to transmit alternately one of the frequencies of one group and another of the frequencies of the other group for substantially equal intervals of time whenever two control functions of different groups are to be effected.

2. In a frequency selective system, the combination of a plurality of electron discharge devices having input circuits respectively responsive to predetermined different audio-frequencies respectively rendered conducting upon impression of the predetermined audio frequencies on their input circuits, a control pentode associated with each of said devices and having its control grid directly connected to the plate of its associated device, a source of plate potential for said devices, means directly connecting said source to the cathodes of said pentodes, load resistors respectively connecting said source to the plates of said devices, and a condenser of relatively high value connected in parallel with each of said load resistors, whereby said pentodes will normally be conducting and will be rendered nonconducting only upon flow of appreciable plate current in their associated devices.

3. The combination set forth in claim 2 in which means are provided to prevent the potential on the plates of said devices from dropping below a predetermined minimum value substantially greater than zero.

4. In a control apparatus for responding to the highest amplitude signal of a plurality of signals of different predetermined frequencies, the combination of a plurality of resonant meshes respectively tuned to said predetermined frequencies, means for supplying a signal containing one or more of said predetermined frequencies to said meshes, a plurality of electron discharge devices each having a cathode, control grid, and plate, means for coupling the input circuits of said devices respectively to said reasonant meshes, a common self-bias means connected to the cathodes of said devices, said self-bias means being of sufficiently high impedance that plate current flow through one of said devices will result in a substantial increase in the self-bias provided for said devices, and means in the output circuits of said devices for effecting different control functions, in which the output of each of said electron discharge devices is coupled to the input circuit of a second electron discharge device by a conductor connecting the plate of the first device with the control grid of the second device, in which a delay network comprising load resistor having a condenser in parallel therewith is connected to each of said conductors, and in which means are provided to maintain the potential on the plate of each of said first devices above a predetermined minimum value.

5. In a transmitting station of a remote control system, the combination of a pair of oscillators each tunable to either one of two different frequencies, a third oscillator tuned to generate a cancel frequency differing from those generated by said pair of oscillators, a plurality of control switches for selecting the frequencies to be transmitted from the station, two of said switches being provided respectively to control the frequencies at which said pair of oscillators shall oscillate, each to a predetermined one of the two frequencies capable of generation thereby, means operated by each of said control switches to cause transmission from the station of one of the four frequencies produced by said pair of oscillators, and continuously operating switch means for causing alternate transmission of the frequencies generated by said pair of oscillators whenever two of the control switches selecting such frequencies are simultaneously operated.

6. The combination set forth in claim 5 in which means are provided to effect transmission from the station of said cancel frequency whenever none of said control switches is operated.

7. In a remote control apparatus for effecting a plurality of different control functions by the transmission of audio frequency signals, the combination of a plurality of meshes tuned to said signal frequencies, a plurality of pentodes having input circuits respectively coupled to said meshes, common cathode means of relatively high impedance for producing grid bias potentials on said pentodes whereby when one of said pentodes is rendered conducting by having its respective signal frequency impressed upon its input circuit said pentodes will have their grid bias increased, a plurality of electron discharge devices each comprising a cathode, control grid and plate, means for coupling said electron discharge devices respectively to said pentodes, each of said coupling means comprising a conductor connecting the plate of the pentode with the grid of the electron discharge device, and a resistance-capacitance delay mesh in the plate circuit of said pentode making it necessary for the pentode to conduct for an appreciable length of time to enable the potential on the grid of said device to be lowered substantially toward cutoff, and a normally energized relay for effecting a control function connected in the output circuit of each of said devices.

8. In a remote control system, the combination of a plurality of frequency selective channels each selective of a different frequency, each channel including a first pentode rendered conductive only when in the received signal its frequency is of higher amplitude than any of the other signal frequencies, a second pentode having its control grid directly connected to the plate of the first pentode, a plate load resistor for said first pentodes, a condenser connected in parallel with said resistor and having a capacity relative to the value of said resistor that plate current may flow in said first pentode for a substantial time interval before the voltage at said plate is reduced to a value substantially cutting off said second pentode, means effecting a control function in response to substantial changes in current flow through said second pentode, and means for limiting the possible voltage drop on the plate of said first pentode due to flow of plate current therein.

9. The combination set forth in claim 8 in which said means for limiting the possible plate voltage drop comprises a diode having its cathode connected to the plate of said first pentode and having its plate connected to a source of constant voltage sufficiently high to supply plate current to said first pentode whenever the voltage on said plate drops to a value sufficiently low to render said diode conducting.

10. In a remote control system for effecting a single control function at a receiving station in response to the alternate reception of two different frequencies at short intervals, the combination of means to limit the amplitude of the signal received at the receiving station, two channels coupled to the output of the amplitude limiting means and respectively responsive to said two frequencies, each of said channels including an electron discharge device and time delay means operable to render the associated devices effective only after reception of the signal for an appreciable interval of time and to render its device ineffective only after the reception of the signal in appreciable amplitude has been discontinued for an interval greater than one half the period of a cycle of alternations of the two frequencies, and a control circuit rendered effective by said devices only when both of the devices are effective.

11. The combination set forth in claim 10 in which there is a thermal relay having its heater in the control circuit, whereby the relay will be operative only after both of the devices have been rendered effective for a time interval greatly exceeding the period of a cycle of alternations of the two frequencies.

12. In a remote control system operating through the selective transmission in rapid alternation of two of a plurality of different audio frequencies, the cycle of alternations having a period in the order of $^1/_{11}$ of a second, a receiving station having a plurality of channels including tuned means respectively responsive to said frequencies, a device in each of said channels responding to reception of the frequency to which the channel is tuned, means to cause operation of said device only after the particular frequency for its channel has been received for an interval of time substantially less than $^1/_{22}$ of a second, and means to prevent discontinuance of the operation of the device only after the particular frequency has not been received in significant amplitude for an interval of time in the order of $^1/_{12}$ of a second.

13. In a remote control system for effecting any one of a plurality of control functions in response to the transmission of one of a plurality of given frequencies from a transmitting station capable of selectively transmitting any one of the given frequencies, a receiving station comprising a signal amplitude limiting electron discharge device having its input coupled to receive signals from the transmitting station, a plurality of channels coupled in parallel to the output of said device, each of said channels comprising a resonant mesh resonating at one of said given frequencies, a plurality of pentodes having their input circuits coupled to said meshes respectively, a common high impedance self-bias means for said pentodes, said self-bias means operating to increase the self-bias on all of said pentodes as a signal supplied to one of said pentodes increases in amplitude, means responsive to plate current flow in said pentodes comprising a plurality of multi-electrode electron discharge tubes having their input circuits respectively coupled to the output circuits of said pentodes, means for biasing said multi-electrode electron discharge tubes so as to cause them normally to conduct substantial plate current, and means coupling each of the pentodes and its associated multi-electrode electron discharge tube to cause a gradual increase in negative bias on the tube as successive plate current impulses occur in its associated pentode as the result of the impression of a sufficiently high amplitude signal upon the input circuit of said pentode.

LAURENS HAMMOND.

REFERENCES CITED

The following references are of record in the file of this patent:

UNITED STATES PATENTS

| Number | Name | Date |
|---|---|---|
| 1,514,699 | Hanson | Nov. 11, 1924 |
| 1,597,416 | Mirick | Aug. 24, 1926 |
| 1,972,682 | FitzGerald | Sept. 4, 1934 |
| 1,988,614 | Tuczek | Jan. 22, 1935 |
| 2,129,740 | Lewis | Sept. 13, 1938 |
| 2,156,809 | Frederickson | May 2, 1939 |
| 2,160,073 | Koch | May 30, 1939 |
| 2,165,800 | Koch | July 11, 1939 |
| 2,173,154 | Bernard | Sept. 19, 1939 |
| 2,332,536 | Schlegel | Oct. 26, 1943 |
| 2,356,364 | Tice | Aug. 22, 1944 |
| 2,388,576 | Seeley et al. | Nov. 6, 1945 |
| 2,397,088 | Clay | Mar. 26, 1946 |
| 2,420,868 | Crosby | May 20, 1947 |

FOREIGN PATENTS

| Number | Country | Date |
|---|---|---|
| 509,866 | Great Britain | July 24, 1939 |
| 117,525 | Australia | Sept. 30, 1943 |